(12) United States Patent
Krishnappa et al.

(10) Patent No.: US 9,939,870 B2
(45) Date of Patent: Apr. 10, 2018

(54) APPARATUS AND METHOD FOR POWER MANAGEMENT TO MITIGATE DECLINING BATTERY CAPACITY

(71) Applicant: MOTOROLA MOBILITY LLC, Chicago, IL (US)

(72) Inventors: Abhijith Krishnappa, Bangalore (IN); Wayne Ballantyne, Coconut Creek, FL (US); Karthik Kumar, Bangalore (IN); David A. Winkler, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 21 days.

(21) Appl. No.: 14/753,149

(22) Filed: Jun. 29, 2015

(65) Prior Publication Data

US 2016/0378165 A1 Dec. 29, 2016

(51) Int. Cl.
*G06F 1/32* (2006.01)
(52) U.S. Cl.
CPC .......... *G06F 1/3203* (2013.01); *G06F 1/3212* (2013.01); *G06F 1/3265* (2013.01); *G06F 1/3287* (2013.01); *Y02B 60/1242* (2013.01); *Y02B 60/1282* (2013.01); *Y02B 60/1292* (2013.01)
(58) Field of Classification Search
CPC .............. G06F 1/3234; G01R 31/3606; G01R 31/3679; G01R 31/3658; H02J 7/0063; H02J 2007/0067
See application file for complete search history.

(56) References Cited

U.S. PATENT DOCUMENTS

| | | | |
|---|---|---|---|
| 5,028,806 A | 7/1991 | Stewart et al. | |
| 5,808,445 A | 9/1998 | Aylor et al. | |
| 6,294,894 B1 * | 9/2001 | Ochiai | G01R 31/3658 320/132 |
| 8,731,622 B2 | 5/2014 | Kanade et al. | |
| 2010/0036628 A1 * | 2/2010 | Plestid | G01R 31/3679 702/63 |
| 2010/0145643 A1 | 6/2010 | Katpelly et al. | |
| 2012/0072752 A1 * | 3/2012 | Kennedy | G06F 1/3206 713/323 |
| 2013/0099724 A1 * | 4/2013 | Rich | H02J 7/00 320/106 |
| 2013/0103960 A1 | 4/2013 | Alberth et al. | |
| 2014/0029498 A1 | 1/2014 | Kim et al. | |
| 2014/0274224 A1 | 9/2014 | Patel et al. | |
| 2014/0289543 A1 | 9/2014 | Flores Assad et al. | |
| 2014/0366031 A1 | 12/2014 | Jiang et al. | |

* cited by examiner

*Primary Examiner* — Terrell S Johnson
(74) *Attorney, Agent, or Firm* — Yudell Isidore PLLC (57) ABSTRACT

A method and apparatus reduce power consumption and mitigate declining battery life. In some embodiments, an initial full charge capacity, C(O), of a rechargeable battery is determined. A full charge capacity, C(t), of the rechargeable battery is determined at time t. An average power consumption profile is determined. A reduced power consumption is implemented based on the average power consumption profile and a factor C(t)/C(O). In other embodiments, functions that are not used in an average power consumption profile are deactivated. Other functions that occur in certain use cases of the average power consumption profile are activated and deactivated as needed.

18 Claims, 5 Drawing Sheets

┌─ 705
REDUCE THE PARAMETER $RP_i$ OF AT LEAST ONE USE CASE $UC_i$ WHEREIN THE REDUCTION OF $RP_i$ IS LIMITED SUCH THAT OPERATION OF THE USE CASE $UC_i$ IS NOT NOTICEABLY CHANGED

┌─ 805
DEFER THE STEP OF IMPLEMENTING THE REDUCED POWER CONSUMPTION UNTIL ONE OF AN INSTANTANEOUS BATTERY CAPACITY MEASURED DURING A DISCHARGE BECOMES LESS THAN A CAPACITY THRESHOLD, AND A POWER CONSUMPTION MEASURED DURING A DISCHARGE BECOMES GREATER THAN A POWER THRESHOLD

┌─ 905
REDEFINE $C(0)$ UPON THE OCCURRENCE AT LEAST ONE OF THE FOLLOWING CONDITIONS:
- A NEW USER BECOMES THE PRIMARY OPERATOR OF THE USER DEVICE;
- THE RECHARGEABLE BATTERY IS REPLACED; AND
- THE RECHARGEABLE BATTERY IS AUGMENTED.

APPARATUS AND METHOD FOR POWER MANAGEMENT TO MITIGATE DECLINING BATTERY CAPACITY

FIELD OF THE INVENTION

The present invention relates generally to power management, and more specifically to power management of a personal electronic device having a rechargeable battery.

BACKGROUND

Most electronic devices that are portable user devices, such as cellular telephones, tablets, and music players, and some non-user devices, such as stationary sensors and monitors, rely upon a rechargeable battery as a primary power source. When one of these electronic devices with a fully charged battery is used to perform a set of operations that are repeated with good predictability, the duration for which the set of operations can be performed until the rechargeable battery is fully discharged, will be slowly decreased due to aging of the battery. For portable user devices, this can lead to user disappointment in the performance of the electronic device. For non-user devices, this can lead to other problems. For example, an electronic sensor that is recharged daily by sunlight may initially provide satisfactory service, such as making three reports per day, but may become unable to do so, due to reduced fully charged battery capacity caused by aging of the battery.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The description is meant to be taken in conjunction with the accompanying drawings in which:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to mitigating the declining battery capacity that occurs in electronic devices that rely upon rechargeable batteries, due to aging of the battery, by reducing the power consumption of operations that are used in a repetitive manner. The power reduction is implemented in a manner calculated to reduce the power used by the operations as determined by a ratio of a present full charge capacity of the rechargeable battery to an initial full charge capacity of the rechargeable battery. The power reductions are selected to reduce the power with minimal impact to the user.

It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "including," "having", or any variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a", "includes . . . a, or "having . . . a" does not, without more constraints, preclude the existence of additional identical elements in the process, method, article, or apparatus that comprises, includes, or has the element. The term "coupled" as used herein is defined in the sense that information or energy is passed from one electrical device to another, not necessarily directly, and not necessarily without delay or temporary storage.

Figure 1:
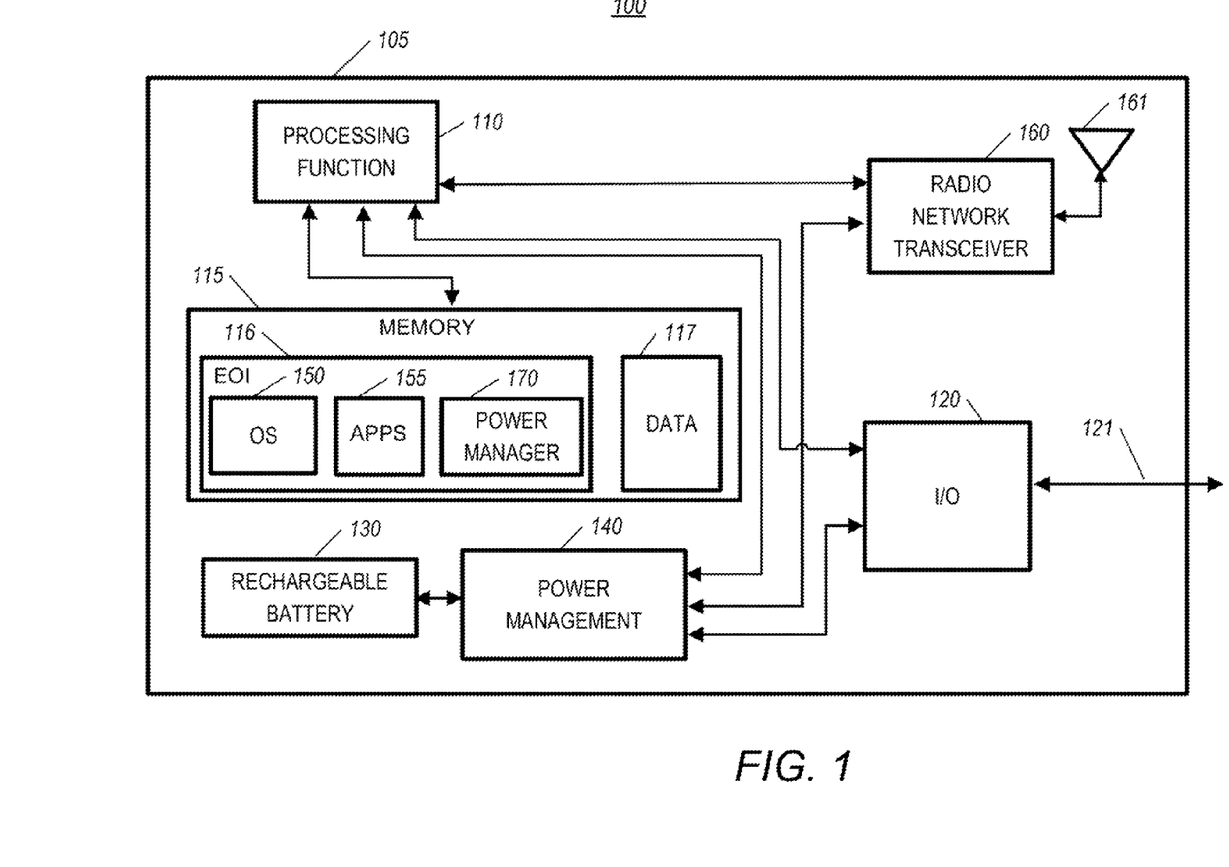
FIG. 1, is a functional block diagram that shows an electronic device, in accordance with certain embodiments.

Referring to FIG. 1, a functional block diagram 100 shows an electronic device 105, in accordance with certain embodiments. The electronic device 105 includes a processing function 110, a memory 115, input/output interface circuitry 120, a rechargeable battery 130, a power control and monitor function 140, a radio network transceiver 160, and an antenna 161. The processing function 110 comprises one or more processing devices, each of which may include such sub-functions as central processing units, cache memory, instruction decoders, just to name a few. The processing function 110 executes program instructions which may be located within memory in the processing devices, or may located in a memory 115 external to the processing function 110, to which the memory 115 is bi-directionally coupled, or in a combination of both. The processing function 110 may, in some embodiments, be further coupled to a radio wide area network receive-transmit function (also referred to as the radio network transceiver) 160 that is coupled to a radio antenna 161, which may be internal or external to the electronic device 105. The radio network transceiver 160 in some embodiments is a cellular receiver-transmitter, and in some embodiments is a cellular telephone. The electronic device 105 may further include (not shown in FIG. 1) one or more additional radio transceivers, for example a BlueTooth® transceiver and/or a Wi-Fi transceiver, and/or a second radio network transceiver. In some embodiments one or more of the radio transceivers themselves comprise one or more processors and memory, and may also comprise circuits that are unique to radio protocols defined by an industry standard. Some embodiments of electronic device 105 may have no radio transceivers, such as a personal electronic device that only plays music. Some embodiments may have a Wi-Fi transceiver but no cellular transceiver, such as some devices commonly referred to as pads or tablets.

The functional block diagram 100 (FIG. 1) shows the executable operating instructions (EOI) 116 being stored in the memory 115, external to the processing function 110. The memory 115 also stores data 117. The EOI 116 of the electronic device 105 includes groups of instructions identified as an operating system (OS) 150, software applications 155 (including software utilities), and power manager 170. The combination of the processing function 110, the EOI 116, and the data 117 may also be referred to as the processing system of the electronic device 105. The processing function 110 may include input/output (I/O) interface circuitry and/or may be coupled, as shown in FIG. 1, to separate I/O interface circuitry 120 that is controlled by the processing function 110. The I/O interface circuitry 120 provides for communications between the processing system and hardware elements of the electronic device, including human interface components, such as keys, displays, and to wired I/O 121 such as that which uses standard hardware and software protocols Universal Serial Bus, 1394, or Ethernet. The wired input 121 may include a connector for a signal cable that include conductors that provide charging current, or the wired input 121 may include a separate connector for connecting a charging cable to the electronic device 105. The electronic device 105 is powered primarily by a rechargeable battery 130, which may be coupled to all (with few exceptions) power consuming circuitry, and to the power control and monitor function 140. In some embodiments of the electronic device 105, an auxiliary battery (not shown in FIG. 1) may be provided only for specific functions and is typically not involved in recharging the rechargeable battery. The auxiliary battery may power the few exceptions of power consuming circuitry that are not powered by the rechargeable battery 130 For example, a lithium button cell may be used as an auxiliary battery in some embodiments for clock backup and/or memory retention of certain information when the rechargeable battery 130 is removed or is completely discharged. The auxiliary battery in these embodiments typically provides none or does not provide a significant amount (for example, much less than 1%) of the recharging current for the rechargeable battery 130.

The rechargeable battery 130 may comprise one or more rechargeable batteries. For example, the rechargeable battery 130 may comprise a single internal battery, an internal and an external battery effectively coupled in parallel, or a plurality of internal batteries in series, or a plurality of internal batteries in parallel. The power control and monitor function 140 may include power related circuits, processing functions and memory, and may provide a variety of power controlling and power monitoring functions. One purpose of the power control and monitor function 140 is to determine a full charge capacity, C(t), of the rechargeable battery during each discharge/recharge. The value of C(t) when the battery is new is C(O), and is referred to as the initial full charge capacity at a specified reference temperature $T_R$, such as 25 degrees C.°. In subsequent discussions, C(t) refers to the currently estimated battery capacity at the same specified temperature $T_R$. A discharge/recharge, for the purposes of this document, is a discharge of the battery from a first full charge capacity $C(t_1)$ to a lesser charge capacity, then a recharge back to a second full charge capacity $C(t_2)$, which may be approximately equal to $C(t_1)$, or less than $C(t_1)$. Normally, C(t) degrades slowly during a plurality of discharge/recharges, until C(t) reaches a full charge capacity minimum threshold, CT, after many discharge/recharges. At the threshold CT the rechargeable battery cannot support minimum acceptable functionality for a reasonable duration, for example 3 hrs. This minimum threshold CT may vary depending on how the electronic device is normally used, which in some embodiments may be approximately 30% of C(0). Note that a discharge/recharge is not necessarily a full discharge/recharge that is, the device may not be discharged to Cminimum, nor charged to 100% of the present capacity C(t). Cminimum, which ideally is close to 0% of C(t), is the charge level below which some normal functions cannot be reliably performed and the electronic device 105 will typically go into a sleep or shutdown mode to avoid reaching a state in which electronic device 105 cannot even function enough to perform basic services such as attaching to a wireless network or powering up. Regardless of whether the user fully charges or discharges the battery during actual usage, the power control and monitor function 140 can always estimate the full charge capacity C(t) after the charging cycle ends, even if said charging cycle results in the battery being charged to <100%, and even if the user's usage pattern occurs at temperatures other than the specified reference temperature $T_R$.

The value of the initial full charge capacity, C(0), of the rechargeable battery may be downloaded into the electronic device at the time of manufacture of the electronic device 105 or determined by the power control and monitor function 140 at the time the electronic device 105 is installed or turned over to a user, or at a later time if the rechargeable battery is significantly changed. For example, when a second rechargeable battery is added in parallel to the existing one, the power control and monitor function 140 can establish a new C(0) of the combined pair. As another example, when the original rechargeable battery 130 is replaced by a new rechargeable battery, the power control and monitor function 140 can establish a new C(0) of the new battery. The power control and monitor function 140 can also determine the remaining capacity during a discharge/recharge, CR(t), which may be expressed as a percentage of C(t), a certain number of ampere-hours, or a certain number of Joules. In some embodiments, the determination of the values CR(t) and C(t) are performed by a Maxim Integrated™ circuit model 17047, which forms a portion of the power control and monitor function 140. Another function of the power control and monitor function 140 may be to regulate charging current passing from the I/O interface 120 to the rechargeable battery 130 during a recharge. Functions related to power control and monitoring may be shared between the processing system, using the power manager group of instructions 170, and the power control and monitor function 140. For example, storage of C(0) may be done in the processing system, as well as all or some of the method steps described hereafter, whereas the determination of C(t) may be done by the power control and monitor function 140.

As noted above, the electronic device may be any electronic device that uses a rechargeable battery as its most significant, and in many devices, its sole source of power. Thus, it may be a cellular telephone, a music player, a portable DVD player, a personal electronic pad, a personal electronic tablet, a portable computer, or a remote wireless sensor, just to name a few. A remote wireless sensor may be, for example, a security camera, a chemical sensor, or a traffic monitor.

Because the C(t) degrades with time, when the electronic device 105 is used for performing a predictable set of operations, also called the use cases, the same set of use cases may be able to be performed successfully in exactly the same manner but only for shorter periods of time as C(t) degrades. The periods of time for which the use cases can be performed successfully is called the battery life, which starts after a full recharge of the rechargeable battery 130 and ends when the charge in the rechargeable battery 130 reaches Cminimum. As noted in the background discussion, this may result in undesirable consequences. For example, for devices for which there is a user who uses the device for a repeatable set of operations during a significant portion of the time the device is powered, the user will notice that the amount of time diminishes that the user has to use the device for the same operations before it must be recharged. This may provide the user with a negative experience. For devices that are not monitored continuously by a user, such as a remote sensor, a similar issue arises. When the sensor performs a predictable set of operations, or use cases, the time between required recharges will gradually diminish. Without using the benefits of the embodiments described herein, a maintenance plan interval for recharging would likely be based on the minimum capacity threshold Cminimum and the use cases, which would result in shorter maintenance intervals. The present invention may be able to mitigate the problem of the diminished time between recharges in either situation. For an electronic device having a user, the battery life will appear to the user to be consistent instead of decreasing, while for a non-user electronic device, a recharging service may be scheduled that is longer; that is, it may be based on the initial battery life rather than a later, smaller battery life. A "non-user" electronic device in the context of this document, means a device that is does not have a local user when in normal operation, or has a local user but operates largely autonomously, such as a fitness monitor or a solar powered monitor operating from a battery that is charged by the solar power.

Figure 2:
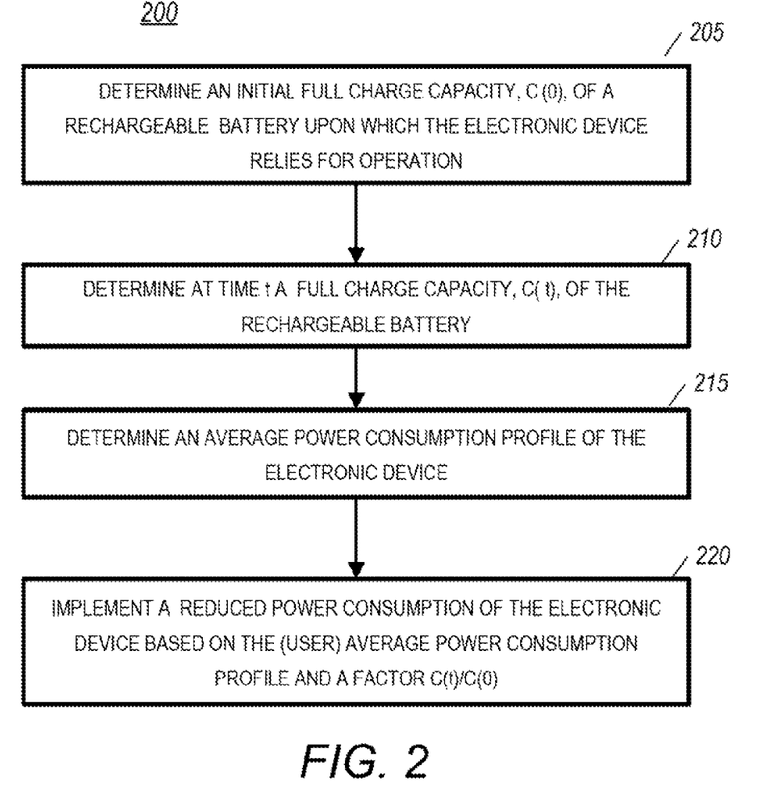
FIG. 2 is a flow chart that shows some steps of a method for power management to mitigate reduced battery capacity in the electronic device described with reference to FIG. 1, in accordance with some embodiments.

Referring to FIG. 2, a flow chart 200 is shown, in accordance with some embodiments. The flow chart 200 shows some steps of a method for power management to mitigate reduced battery capacity. At step 205, the initial full charge capacity, C(0), of the rechargeable battery 130 is determined. This determination may be made during an initial discharge/recharge of the rechargeable battery or may be downloaded into the electronic device 105. At step 210, a full charge capacity, C(t), of the rechargeable battery is determined. C(t) is retained as the full charge capacity of the rechargeable battery during a discharge/recharge, even though it may in fact degrade slightly during the discharge/recharge, as compared to C(0). At step 215 an average power consumption profile of the electronic device is determined. The average power consumption profile may comprise the power consumed by a set of use cases (a use case typically comprises an operation using a software application, the associated supporting software utilities, and hardware that is controlled by the software) during a measurement duration. At step 220, a reduced power consumption of the electronic device 105 is implemented, based on the average power consumption profile and the factor C(t)/C(0). In some embodiments, implementing the reduced power consumption comprises modifying the power used by one or more of the use cases such that were the electronic device to be operated again to perform the same use cases, the power consumed by the operations would be reduced by the factor C(t)/C(0), and the rechargeable battery would sustain the operations for the same discharge time as when the battery had its initial full charge, C(0). The measurement duration for determining the use cases may be such that the reduced battery capacity reaches the battery minimum capacity threshold, Cminimum after being charged to a full charge capacity, C(t), or said measurement duration may span multiple charge and discharge cycles. When the set of use cases is a good prediction of future use of the electronic device, the power consumed by the electronic device 105 may be reduced approximately by the factor C(t)/C(0). When the electronic device 105 is used differently than when the use cases were determined, the power consumption may not be reduced by the factor C(t)/C(0).

Figure 3:
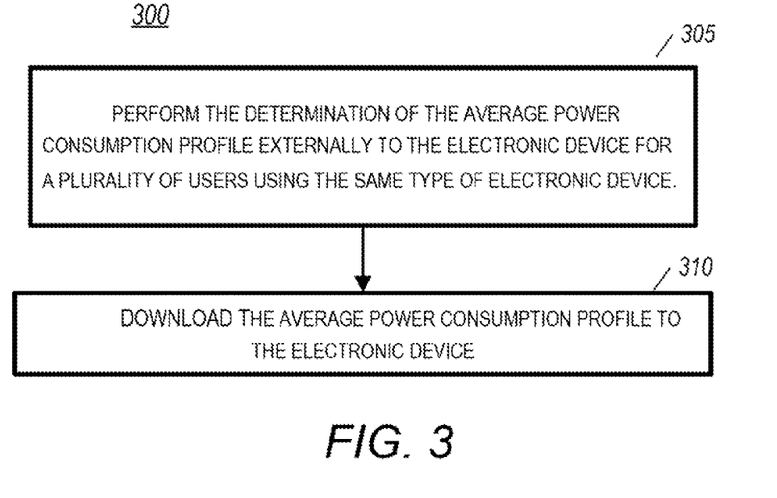
FIG. 3 is a flow chart that shows some steps that may be included in the step 215 of the method described with reference to FIG. 2, in accordance with some embodiments.

Referring to FIG. 3, a flow chart 300 is shown, in accordance with some embodiments. The flow chart 300 shows some steps that may be included in the step 215 of the method for power management to mitigate shortened battery life described with reference to FIG. 2. At step 305, the determination of the average power consumption profile in step 215 (FIG. 1) is performed externally to the electronic device 105 for a plurality of users using the same type of electronic device. At step 310, the average power consumption profile is downloaded to the electronic device 105. In this document, "the same type of electronic device" means either an electronic device with the same model number and baseline software applications, or an electronic device that provides at least the same type of functions and user manipulable features that are provided by the electronic device 105. An example of the latter is when the electronic device 105 is a smart phone, the "same type of electronic device" should be a smart phones that includes the same applications and user manipulable features. An example of a user manipulable feature may be a Wi-Fi hotspot operating mode, which may not be classified by those of ordinary skill in the art as an application. In this process, use cases are defined that encompass all the use cases used by the plurality of users, except those that consume negligible power. "Negligible" in this context may be, for example, 1% or less of the average power of the average power consumption profile. Exemplary use cases include web browsing, reading and composing email, music or video playback, text messaging, smartphone applications like Facebook, Yahoo Finance, etc.

Use case power parameters (power consumption and duration for each use case) for step 305 are measured for each of a plurality of typical users over a duration long enough to determine an average power consumption profile for each of the plurality of typical users. The average power consumption profile is associated with a reference interval. The reference interval may be the user's average discharge/recharge period, or may be much longer. The average power consumption profile comprises fractions of power that each use case over the reference interval. The average power consumption profiles for each of the plurality of users are then mathematically combined to determine the average power consumption profile of typical users of the same type of mobile device, in a manner known to one of ordinary skill in the art. This average power consumption profile may be referred to as an external average power consumption profile. The external average power consumption profile may contain use cases other than those possible in the electronic device 105. In this situation, the external average power consumption profile may be mathematically scaled to eliminate those uses that cannot operate in the electronic device 105, in a manner known to one of ordinary skill in the art.

Figure 4:
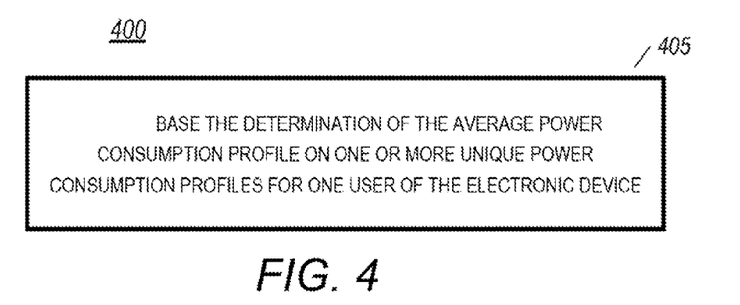
FIG. 4 is a flow chart that shows a step that may be included in the step 215 described with reference to FIG. 2, in accordance with some embodiments.

Referring to FIG. 4, a flow chart 400 is shown, in accordance with some embodiments. The flow chart 400 shows a step that may be included in the step 215 described with reference to FIG. 2. In step 215 the user average power consumption profile of the electronic device is determined. At step 405 the determination is based on one or more previous average power consumption profiles, which may include a most recently determined average power consumption profile. In some embodiments, all previous average power consumption profiles are determined for one user's operation of the electronic device 105, excepting that one previous average power consumption profile may be the external profile described above. This provides a personalized average power consumption profile, in contrast to the external average power consumption profile, which is a group profile. These profiles are each associated with a reference interval. In some embodiments, the electronic device 105 measures use cases over a defined duration. The duration is long enough to determine stable parameters for the set of average use cases for the user. "Long enough" may, for example, be a fixed value determined by one of ordinary skill in the art by reviewing data from a plurality of users using an electronic device 105 of the same type as the electronic device 105 in a heuristic manner. As another example, "long enough" may be determined by mathematical methods used in the electronic device 105 that are known to one of ordinary skill in the art that terminate the measurement duration when a moving averages of the parameters measured during the duration meet stability and variance criteria. An average power consumption profile for the reference interval for the set of use cases is then determined from the measurements when the measurement duration is different from the reference interval. The reference interval may, for example, be an average discharge/recharge, or more typically on the order of several average discharge/recharges of the electronic device 105.

In accordance with some embodiments, a downloaded, externally determined average power consumption profile is used as an initial average power consumption profile. In some embodiments an initial average power consumption profile is determined within the electronic device, which may be determined starting at the time of user acceptance or installation of the electronic device. This may be called the initial internal average power consumption profile. When an externally determined average external power profile is used, the electronic device may determine use cases of the external average power consumption profile that are not used (i.e, are irrelevant) and modify the external average power consumption profile to remove them. The electronic device 105 may determine further internal average power consumption profiles. The initial internal average power consumption profile may be used to replace the external average power consumption profile, or may be mathematically merged with the external average power consumption profile, using weighting. Other average power consumption profiles determined later may be merged with previous average power consumption profiles, using weighting, such as time base weighting, in a manner known to those of ordinary skill in the art to give more weight to more recent profiles. This is referred to as updating the average power consumption profile of the use case.

Figure 5:
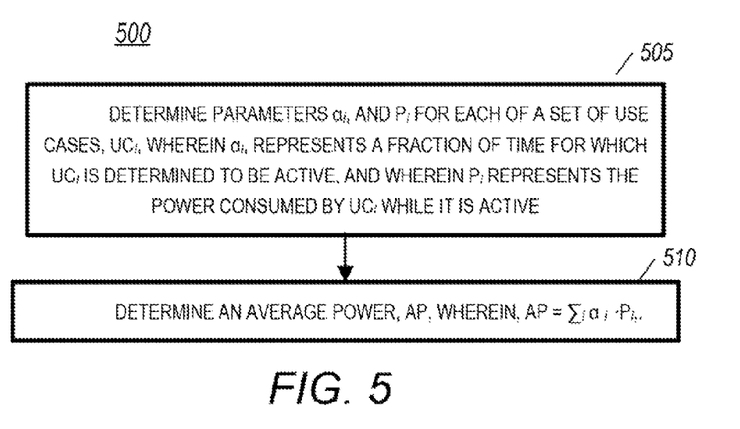
FIG. 5 is a flow chart that shows some steps that may be included in the step 220 described with reference to FIG. 2, in accordance with some embodiments.

Referring to FIG. 5, a flow chart 500 is shown, in accordance with some embodiments. The flow chart 500 shows some steps that may be included in the step 220 described with reference to FIG. 2. In step 220 a reduced power consumption of the electronic device is implemented, based on the user average power consumption profile and a factor $C(t)/C(0)$. At step 505, parameters $\alpha_i$, and $P_i$ for each of a set of use cases, $UC_i$, are determined. The parameter $\alpha_i$, represents a fraction of time for which the $UC_i$ is determined to be active. The parameter $P_i$ represents the power consumed by the $UC_i$ while it is active. At step 510, an average power, AP, is determined for the uses cases as: $AP=\Sigma_i(\alpha_i \cdot P_i,)$ Some embodiments have a use case $UC_0$ representing power consumption during a standby state of the electronic device.

In some embodiments, each use case is defined as an operation that occurs for a measurable duration (perhaps multiple times during the reference interval). Associated with the use case is the power consumed by the electronic device 105 over that duration. The use case is typically an operation performed by a primary application, supporting utilities or services for the primary application, and hardware controlled by the primary application. (As noted above, a use case may alternatively include a user manipulable operation not considered an application). The application and supporting utilities of the use case do not operate when the electronic device 105 is in a standby state of the electronic device 105, although standby utilities that operate in the standby state may also be operating during a use case (e.g., email synchronization). When the electronic device 105 is a user device, the use case may be identified according to the user interaction, which may be the identity of the primary application used in the use case. For example, when a user operates a navigation application in the foreground of the display, the use case may be identified as "navigation" and the use case may include the power consumed to run the navigation application as well as utilities and hardware that support the navigation application, such as a display utility and a navigation radio communications, as well as utilities that run during both the standby state and the use case. For these embodiments $\Sigma_i \alpha_i=1$. The fraction of the reference interval that the electronic device 105 is in the standby use case is $\alpha_0$. The standby use case may include such activities as paging, cell connectivity management, time keeping, and email synchronization.

For embodiments for which there is no user that operates the electronic device during most of each discharge/recharge, the use cases may be identified by the operations being performed. For example, for a wireless security camera, use cases may include: capture and transmit one frame every t1 seconds, upon command capture twenty short interval frames and transmit them, capture twenty short interval frames in response to a particular quantity of motion detections within a particular duration. For these embodiments, each of these operations could be a use case, with different $P_i$ defined for capturing and transmitting one frame and capturing and sending twenty short interval frames. The power consumed by polling to receive the commands may be included in $P_0$. The use of the reduced power consumption parameters in non-user situations, in accordance with the embodiments described herein, may enable the same amount of data gathering between recharge intervals while the rechargeable battery's full charge capacity C(t) degrades over time. For example, when the electronic device 105 is a solar powered monitor in which the solar power is used to recharge a rechargeable battery, the same amount of data may be gathered during each day over a long time period even though C(t) is declining. When the electronic device 105 is not solar power recharged, such as an electronic device 105 for which the rechargeable battery is removed and recharged every week, the same amount of data may be gathered during each discharge cycle over a long time period as the battery life degrades over time.

Figure 6:
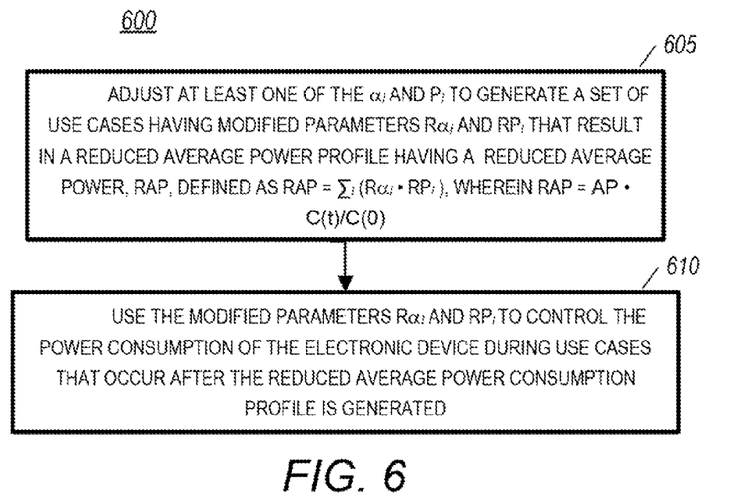
FIG. 6 is a flow chart 600 that shows a step that may be included in the step 220 described with reference to FIG. 2, in accordance with some embodiments.

Referring to FIG. 6, a flow chart 600 is shown, in accordance with some embodiments. The flow chart 600 shows a step that may be included in the step 220 described with reference to FIG. 2. In step 220 a reduced power consumption of the electronic device is implemented, based on the user average power consumption profile and a factor C(t)/C(0). At step 605, at least one of the $\alpha_i$ and $P_i$ are adjusted to generate a set of use cases having modified parameters $R\alpha_i$ and $RP_i$ that result in a reduced power consumption profile that has a reduced average power, RAP, defined as RAP=$\Sigma_i(R\alpha_i \times RP_i)$, wherein RAP=AP·C(t)/c(0). At step 610, the modified parameters $R\alpha_i$ and $RP_i$ are used to control the power consumption of the electronic device during use cases that occur after the reduced user average power consumption profile is generated. By using these modified parameters, the average power consumed by the electronic device 105 when it is operated for the reference interval will then be reduced to be as close to the RAP as the usage of the electronic device 105 is close to the set of use cases in the reduced average power profile.

For some embodiments, adjusting the $\alpha_i$ and/or $P_i$ of a use case to achieve RAP=AP×C(t)/c(0) may comprise adjusting the power consumed by the operation of one more of the applications and support utilities operating during the use case, (not the standby utilities), by a common factor. Some operations of a particular use case may be identified as being not adjustable. For some embodiments, adjusting the $P_i$ may comprise reducing the power consumed by only some applications and utilities of the use case $UC_i$. When the powers consumed by the operation of two or more applications and support utilities used in a use case are adjusted, they may not necessarily be adjusted by the same amount. The power consumed by the operation of a particular application or support utility that is common to a plurality of use cases may be reduced by a same amount in all use cases. An example for which this may be beneficial is a display operation, in which the display brightness is reduced by adjusting the operation of the display support utility to reduce the power consumed. Furthermore, $P_0$ may be reduced by reducing the power consumed by one or more standby utilities, which may affect all use cases to some extent, typically a small extent for many use cases.

For some embodiments the $\alpha_i$ parameters may also be adjusted to achieve RAP=AP×C(t)/C(0). For the embodiments in which $\Sigma_i\alpha_i=1$, a decrease of one or more $\alpha_i$ requires the increase of at least one other $\alpha_i$, in order to maintain $\Sigma_i\alpha_i=1$. The alteration of $\alpha_i$, can achieve power reduction when, for example, the $\alpha_i$, of a use case that has a particular power $P_i$ is decreased and the $\alpha_i$, of a use case that has a lower power $P_i$ is increased by a corresponding amount. In the general case, both the $\alpha_i$ and the $P_i$ may be modified to reduce the total average power RAP, such that RAP=AP×C(t)/C(0).

The technique used to achieve the reduction of power consumed by the operation of a specific application, support utility, or standby utility is dependent on the specific application, support utility, or standby utility. Techniques are known in the art for accomplishing fractional power reduction for many applications, support utilities, and standby utilities. For example, utilities that operate in a synchronous manner may operate using a high power during short periods that are separated by long intervals during which minimal power is consumed. Two examples are email updating and network message paging. Power reduction can be achieved in these examples by lengthening the long interval parameters. In other cases, a particular aspect of a utility can be modified, such as the brightness of a display. Operations using data streaming may be modified by slowing the rate of streaming when it is greater than needed for acceptable operation. A position update rate may be slowed for a navigation application.

Figure 7:
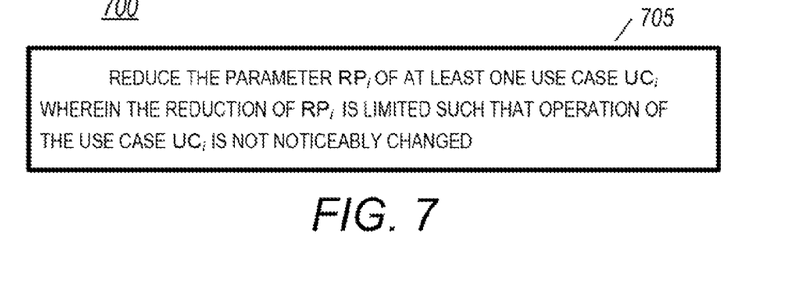
FIG. 7 is a flow chart 700 that shows a step that may be included in the step 605 described with reference to FIG. 6, in accordance with some embodiments.

Referring to FIG. 7, a flow chart 700 is shown, in accordance with some embodiments. The flow chart 700 shows a step that may be included in the step 605 described with reference to FIG. 6. In step 605 at least one of the $\alpha_i$ and $P_i$ are adjusted to generate a set of use cases having modified parameters $R\alpha_i$ and $RP_i$ that result in the reduced average power, RAP. At step 705 the parameter $RP_i$ of at least one use case $UC_i$ is reduced. The reduction of $RP_i$ is limited such that operation of the use case $UC_i$ is not noticeably changed. The determination of the reduced $RP_i$ may be dependent on a unique noticeability power reduction limit for each of the applications or utilities that are used in the operation of the use case for which the $RP_i$ is being determined. For example, in a situation in which the operation of a display brightness utility is altered to reduce the display brightness (and consequently the display power) during a navigation use case, the limit at which the change of performance of the display is noticed will be used. This value of reduced power for the display, as well as the reduced power consumed by the operation of any other applications or support utilities that are modified, are then combined to determine $RP_i$. The determination of the unique noticeability power reduction limit for each application or utility for can be done by user testing using techniques well known to those of ordinary skill in the art. Because the change of full battery capacity is typically very slow it will be appreciated that noticeability is related to long time intervals, and the testing to determine a noticeability power reduction limit must accommodate this aspect.

Figure 8:
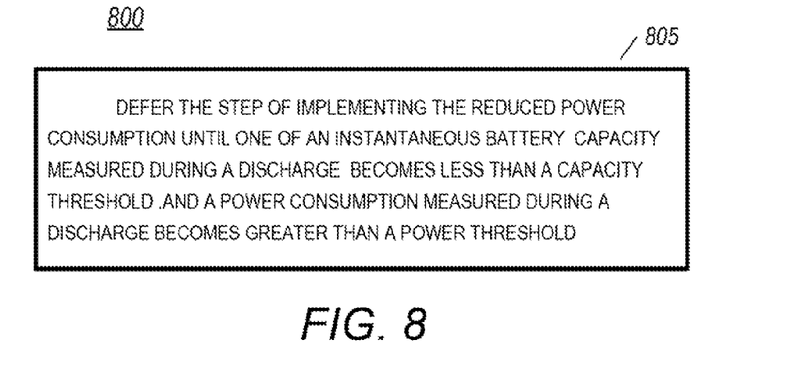
FIG. 8 is a flow chart that shows a step that may be included in the method for power management to mitigate shortened battery life described with reference to FIG. 2, in accordance with some embodiments.

Referring to FIG. 8, a flow chart 800 is shown, in accordance with some embodiments. The flow chart 800 shows a step 805 that may be included in the method for power management to mitigate shortened battery life described with reference to FIG. 2 and the flow chart 200. At step 805, the step of implementing the reduced power consumption is deferred until an electrical measurement reaches a particular threshold. In some embodiments an instantaneous battery capacity is measured during a discharge of the rechargeable battery from the full charge capacity, C(t), and the threshold is a battery capacity threshold. The threshold is reached when the instantaneous battery capacity goes below the battery capacity threshold. For example, the battery capacity threshold may be 15% of C(t). In some embodiments the power consumption is measured during a discharge of the rechargeable battery from the full capacity, C(t), and the threshold is a power consumption threshold. The threshold is reached when the power consumption goes above the power consumption threshold. For example, the power consumption threshold may be 80% of the power predicted to be consumed when the average power of the average power consumption profile is scaled to a measured average discharge duration. These embodiments delay the implementation of the reduced power consumption until it is required. For a "power" user who enacts a use case profile that uses up most of the initial charge capacity C(0) during the user's average discharge cycle, the thresholds described above would be met quickly, but for a user who does not use the electronic device heavily, the implementation of reduced power consumption is delayed until it is needed.

Figure 9:
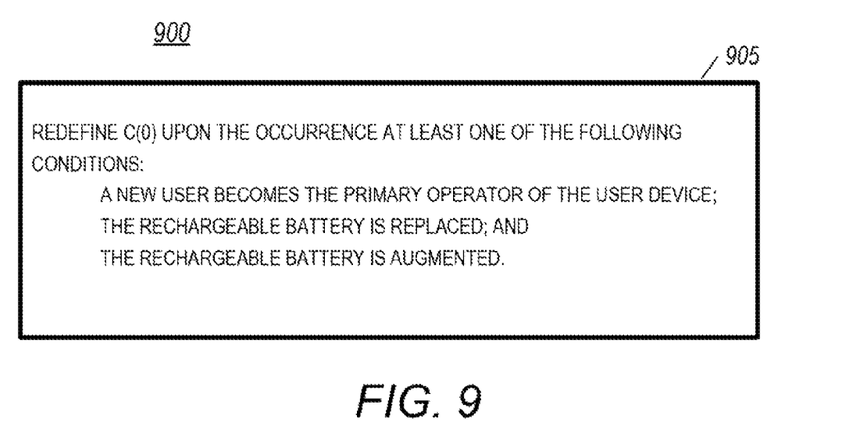
FIG. 9 is a flow chart that shows a step 905 that may be included in the method for power management to mitigate shortened battery life described with reference to FIG. 2, in accordance with some embodiments

Referring to FIG. 9, a flow chart 900 is shown, in accordance with some embodiments. The flow chart 900 shows a step 905 that may be included in the method for power management to mitigate shortened battery life described with reference to FIG. 2 and the flow chart 200. At step 905 C(0) is redefined upon the occurrence at least one of the following three conditions: (1) a new user becomes the primary operator of the user device, (2) the rechargeable battery is replaced, and (3) the rechargeable battery is augmented. The rechargeable battery may be augmented by, for instance, adding an external battery that operates in parallel with the battery 130 of the electronic device.

A notification may be provided to the user when C(t) falls below a threshold. The notification may, for example, indicate that the electronic device will be able perform all functions but that the battery life may have become shortened to an extent that the user may wish to replace the rechargeable battery 130 to avoid noticeably reduced functionality. The full battery capacity at the time of this notice may be identified as Cnoticeable. The notification may be, for example, another type that indicates that the user should replace the rechargeable battery 130 because it at the Cminimum threshold described above with reference to FIG. 1. Cnoticeable is typically higher than that for the indication that the battery life will soon become unusable. For example, the notification that the battery life may be shortened could be at a fixed fraction of C(0), such as 50%, while the notification to replace the rechargeable battery may be at 10%.

When there is more than one user of the electronic device 105, use cases may be generated for the additional users based on an initial external average power consumption profile and internal average power consumption profiles and updates made when each user is using the device. If all users start using the electronic device at approximately the time the device is first put into service, then the reduced average power (RAP) of each use case can be determined using the ratio C(t)/C(0), wherein C(t) is the full charge capacity of the rechargeable battery when a particular user is using the electronic device 105. When an additional user starts using the electronic device 105 significantly later than when the electronic devices was put into service for a first user, then the reduced average power (RAP) of the use case for the additional user can be determined using a ratio $C(t)/C(t_{AU})$, wherein $C(t_{AU})$ is the full charge capacity of the rechargeable battery when the additional user begins using the electronic device 105.

Figure 10:
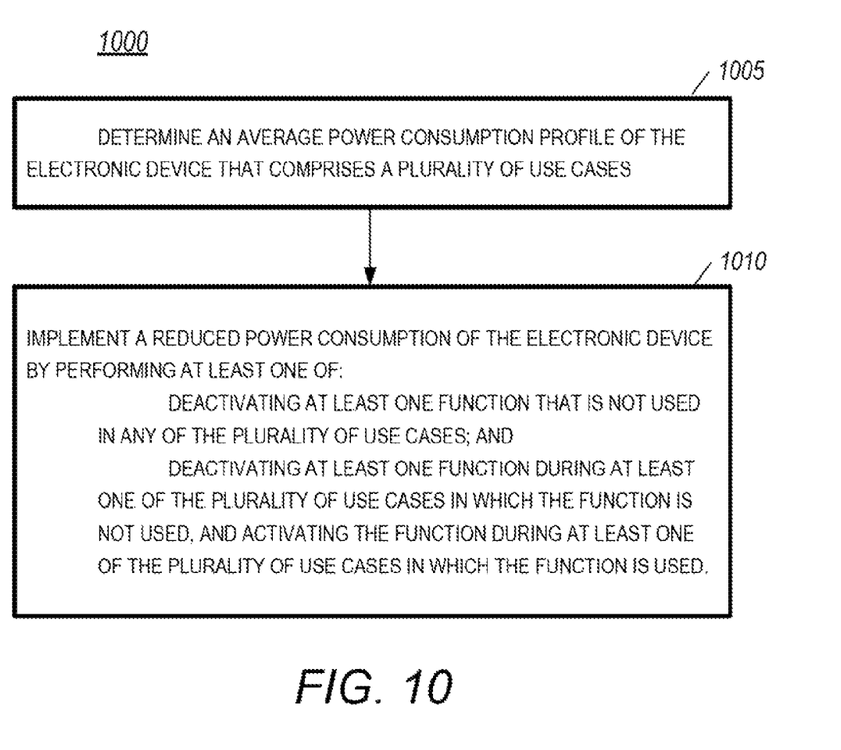
FIG. 10 is a flow chart that shows some steps of a method for power management to improve battery life.

Referring to FIG. 10, a flow chart 1000 is shown, in accordance with some embodiments. The flow chart 1000 shows some steps of a method for power management to improve battery life. At step 1005, an average power consumption profile of the electronic device is determined that comprises a plurality of use cases. At step 1010, a reduced power consumption of the electronic device is implemented by performing at least one of (1) deactivating at least one function that is not used in any of the plurality of use cases; and (2) deactivating at least one function during at least one of the plurality of use cases in which the function is not needed, and activating the function during at least another one of the plurality of use cases in which the function is needed. For the purposes of these embodiments, use cases are defined as described above with reference to FIGS. 2-6 and a function refers to an application and the hardware that supports the application, or a supporting utility and the hardware that supports the supporting utility, or a standby utility and the hardware that supports the standby utility. These embodiments reduce the consumption of power without user intervention. These embodiments therefore improve battery life in a user device having a rechargeable battery. An example of a function that may be deactivated permanently (that is per action (1) cited above in this paragraph) or for certain use cases (that is, per action (2) cited above in this paragraph) is a GPS function, which may be turned on by default in certain electronic devices as shipped. For example, when a determination is made that the use cases specific to an internal average power consumption profile are not in an external, downloaded average power consumption profile, this embodiment deactivates the function per action (1), which a user may not be able to do, or may never think to do. Action (2) may be impossible for a typical user, or very cumbersome for a typical user to accomplish manually, even if the user is aware of when the function is not needed for particular use cases.

In some embodiments having a user, the user may not be made aware of how the use cases are being modified to provide the same functions at acceptable over a battery life that appears to stay the same until a time at which the user is notified to change the battery. In some embodiments, the user may be made aware that the functions are being modified in the subtle manner described above. The user may be given the ability to turn off the power reduction methods described above, in whole or in part. For a power user that normally uses the electronic device in a consistent manner that discharges the rechargeable battery during a repetitive manner such as every night, embodiments described herein may provide a much improved experience. For users who may not discharge the rechargeable battery very far when the electronic device is new, embodiments described herein that include deferring the implementation of the (user) reduced power consumption until a power consumption measured during a discharge is less than a threshold, may have a much improved experience Reference throughout this document are made to "one embodiment", "certain embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The processes illustrated in this document, for example (but not limited to) the method steps described in FIGS. 3-9, may be performed using programmed instructions contained on a computer readable medium which may be read by processor of a CPU. A computer readable medium may be any tangible medium capable of storing instructions to be performed by a microprocessor. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method used for electronic device operation, the method comprising:
   determining an initial full charge capacity, C(0), of a rechargeable battery upon which the electronic device relies for operation;
   determining, at time t, via a power control and monitoring function, a full charge capacity, C(t), of the rechargeable battery;
   determining an average power consumption profile of the electronic device;
   determining a ratio of the full charge capacity C(t) of the rechargeable battery to the initial full charge capacity C(0) of the rechargeable battery;
   determining, via a processor of the electronic device, based on the ratio, a reduced power consumption for select use cases within a set of use cases performed within the electronic device, each use case being a predictable set of operations; and
   implementing, via the processor and power control and monitoring function, a reduced power consumption of the electronic device based on the average power consumption profile and the ratio utilized as a factor C(t)/C(0) applied to power usage parameters for the select use cases.

2. The method for electronic device operation according to claim 1, wherein the determination of the average power consumption profile further comprises:
   performing the determination externally to the electronic device based on a plurality of users using a same type of electronic device; and
   downloading the average power consumption profile to the electronic device.

3. The method for electronic device operation according to claim 1, wherein the determination of the average power consumption profile comprises basing the determination on at least one or more previous average power consumption profiles for one user of the electronic device.

4. The method for electronic device operation according to claim 1, wherein the step of determining the average power consumption profile comprises:
   determining parameters $\alpha i$ and Pi for each of the set of use cases, UCi, wherein $\alpha i$ represents a fraction of time for which UCi is determined to be active in a use case, the use case including an operation performed by a primary application, supporting utilities or services for the primary application, and hardware controlled by the primary application, and wherein Pi represents power consumed by UCi while the use case is active; and
   determining an average power, AP, wherein AP=$\Sigma$I ($\alpha i \cdot$Pi).

5. The method for electronic device operation according to claim 4, wherein the step of implementing a reduced average power consumption comprises:
   adjusting at least one of $\alpha i$ and Pi to generate a modified set of use cases having modified parameters R$\alpha i$ and RPi that result in a reduced average power profile having a reduced average power, RAP, defined as RAP=$\Sigma$I (R$\alpha i \times$RPi), wherein RAP=AP$\times$C(t)/c(0); and
   using the modified parameters R$\alpha i$ and RPi to control the power consumption of the electronic device during use cases that occur after the reduced user average power consumption profile is generated.

6. The method of claim 5, wherein the step of adjusting the at least one of $\alpha i$ and Pi to generate a set of use cases having modified parameters further comprises:
   reducing a modified parameter RPi of at least one use case UCi, wherein the reduction of RPi is limited such that operation of the use case UCi is not noticeably changed.

7. The method for electronic device operation according to claim 1, further comprising:
   deferring the step of implementing the reduced power consumption until at least one of the following occurs:
   an instantaneous battery capacity measured during a discharge of the rechargeable battery from the full charge capacity, C(t), becomes less than a battery capacity threshold; and
   a power consumption during a discharge of the rechargeable battery from the full capacity, C(t), becomes greater than a power consumption threshold.

8. The method of claim 1, further comprising redefining C(0) in response to an occurrence of at least one of the following conditions:
   a new user becomes the primary operator of the user device; and
   the rechargeable battery is augmented.

9. The method for electronic device operation according to claim 1, wherein C(t) is the full charge capacity of the rechargeable battery when a first user is using the electronic device, the method further comprising:
- detecting when an additional user starts using the electronic device; and
- determining the reduced average power (RAP) of a use case for the additional user using a ratio $C(t)/C(t_{AU})$, wherein $C(t_{AU})$ is the full charge capacity of the rechargeable battery when the additional user begins using the electronic device.

10. The method for electronic device operation according to claim 1, wherein the determined average power consumption profile of the electronic device comprises a plurality of use cases, and the method further comprises:
- implementing a reduced power consumption of the electronic device by performing at least one of:
  - deactivating at least one function that is not used in any of the plurality of use cases; and
  - deactivating at least one function during at least one of the plurality of use cases in which the function is not needed, and activating the at least one function during at least another one of the plurality of use cases in which the function is needed;
- wherein a function is one of: an application and hardware that supports the application; a supporting utility and hardware that supports the supporting utility; or a standby utility and hardware that supports the standby utility; and
- wherein a consumption of power by the electronic device is reduced without user intervention.

11. An electronic device, comprising:
- a processor function;
- a memory;
- a rechargeable battery; and
- a power control and monitor function, wherein executable software instructions in the memory are executed by the processor function to interact with the power control and monitor function to perform the following actions:
  - determine an initial full charge capacity, C(0), of the rechargeable battery upon which the electronic device relies for operation;
  - determine, at time t, a full charge capacity, C(t), of the rechargeable battery;
  - determine an average power consumption profile of the electronic device;
  - determine a ratio of the full charge capacity C(t) of the rechargeable battery to the initial full charge capacity C(0) of the rechargeable battery;
  - determining, based on the ratio, a reduced power consumption for select use cases within a set of use cases performed within the electronic device, each select use case being a predictable set of operations; and
  - implement a reduced power consumption of the electronic device based on the average power consumption profile and the ratio utilized as a factor C(t)/C(0) applied to power usage parameters for the select use cases.

12. The electronic device according to claim 11, wherein the determination of the average power consumption profile further comprises:
- performing the determination externally to the electronic device based on a plurality of users using a same type of electronic device; and
- the processor function downloading the average power consumption profile to the electronic device.

13. The electronic device according to claim 11, wherein performing the determination of the average power consumption profile comprises the processor function basing the determination on at least one or more previous average power consumption profiles.

14. The electronic device according to claim 11, wherein determining the average power consumption profile comprises the processor function:
- determining parameters $\alpha i$ and Pi for each of the set of use cases, UCi, wherein $\alpha i$ represents a fraction of time for which UCi is determined to be active for a use case, the use case including an operation performed by a primary application, supporting utilities or services for the primary application, and hardware controlled by the primary application, and wherein Pi represents power consumed by UCi while the use case is active; and
- determining an average power, AP, wherein $AP = \Sigma I (\alpha i \cdot Pi)$.

15. The electronic device according to claim 14, wherein implementing a reduced average power consumption comprises the processor function:
- adjusting at least one of the $\alpha i$ and Pi to generate a set of use cases having modified parameters R$\alpha$i and RPi that result in a reduced average power profile having a reduced average power, RAP, defined as $RAP = \Sigma I (R\alpha i \times RPi)$, wherein $RAP = AP \times C(t)/c(0)$; and
- using the modified parameters R$\alpha$i and RPi to control the power consumption of the electronic device during use cases that occur after a reduced user average power consumption profile is generated.

16. The electronic device according to claim 15 wherein adjusting at least one of the $\alpha i$ and Pi to generate a set of use cases having modified parameters further comprises the processor function:
- reducing a modified parameter RPi of at least one use case UCi, wherein the reduction of RPi is limited such that operation of the use case UCi is not noticeably changed.

17. The electronic device according to claim 11, further comprising the processor function:
- deferring implementing the reduced power consumption until at least one of the following occurs:
  - an instantaneous battery capacity measured during a discharge of the rechargeable battery from the full charge capacity, C(t), becomes less than a battery capacity threshold; and
  - a power consumption during a discharge of the rechargeable battery from the full capacity, C(t), becomes greater than a power consumption threshold.

18. The electronic device according to claim 11, further comprising the processor function redefining C(0) in response to an occurrence of at least one of the following conditions:
- a new user becomes the primary operator of the user device; and
- the rechargeable battery is augmented.

* * * * *